United States Patent
Weikard et al.

(12)

(10) Patent No.: US 6,521,702 B1
(45) Date of Patent: Feb. 18, 2003

(54) AQUEOUS POLYURETHANE EMULSIONS

(75) Inventors: Jan Weikard, Köln (DE); Erhard Lühmann, Leverkusen (DE); Dieter Erdmann, Krefeld (DE); Wolfgang Fischer, Meerbusch (DE); Wolfgang Kremer, Kerken (DE)

(73) Assignee: Bayer Aktiengesellschaft, Leverkusen (DE)

( * ) Notice: Subject to any disclaimer, the term of this patent is extended or adjusted under 35 U.S.C. 154(b) by 16 days.

(21) Appl. No.: 09/716,741

(22) Filed: Nov. 20, 2000

(30) Foreign Application Priority Data

Nov. 30, 1999 (DE) .......................................... 199 57 604

(51) Int. Cl.$^7$ ................ C08J 3/03; C08J 3/05; C09D 175/06; C09D 175/14; C09D 175/16
(52) U.S. Cl. ................ 524/839; 428/423.1; 428/425.1; 522/90; 522/97; 522/98; 522/173; 522/174; 524/507; 524/539; 524/547; 524/591; 524/840; 525/123; 525/131; 525/440; 525/454; 525/455; 525/459; 528/71; 528/75
(58) Field of Search ................ 524/507, 539, 524/547, 591, 839, 840; 525/123, 131, 440, 454, 455, 459; 428/423.1, 425.1; 522/90, 97, 98, 173, 174; 528/71, 75

(56) References Cited

U.S. PATENT DOCUMENTS

| | | | | |
|---|---|---|---|---|
| 4,287,039 A | 9/1981 | Buethe et al. | .......... | 204/159.19 |
| 5,684,081 A | 11/1997 | Dannhorn et al. | .......... | 524/507 |
| 5,990,192 A | 11/1999 | Gerlitz et al. | ................ | 522/93 |
| 6,207,744 B1 | 3/2001 | Paulus et al. | ................ | 524/507 |

FOREIGN PATENT DOCUMENTS

| CA | 2159265 | 3/1996 |
|---|---|---|
| EP | 0 872 502 | 10/1998 |

*Primary Examiner*—Rabon Sergent
(74) *Attorney, Agent, or Firm*—Joseph C. Gil; Thomas W. Roy

(57) ABSTRACT

The present invention relates to a radiation-curable, aqueous polyurethane emulsion which is prepared by I) reacting
 A) 40 to 90 wt. % of an isocyanate-reactive component that contains a polyester acrylate containing hydroxyl groups and having an OH content of 40 to 200 mg KOH/g and optionally other isocyanate-reactive compounds other than B) and
 B) 0.5 to 20 wt. % of one or more monofunctional and/or difunctional isocyanate-reactive compounds that contain cationic or anionic groups, potential cationic or anionic or hydrophilic ether groups, with
 C) 10 to 50 wt. % of one or more diisocyanates and/or polyisocyanates,
II) optionally converting any potential cationic or anionic groups into cationic or anionic groups by salt formation and
III) forming a dispersion of the reaction product of A), B) and C) in water and reacting it with
 D) 0.1 to 10 wt. % of one or more diamines and/or polyamines, wherein the wt. % percentages of (A) to (D) add up to 100%, and the equivalent ratio of the sum of the isocyanate-reactive groups in (A) and (B) to the isocyanate groups in (C) is 0.8:1 to 1.25:1 and the reaction of components (A) and (B) with (C) is carried out such that 65 to 95% of the isocyanate groups in (C) react with the isocyanate-reactive groups of (A) and (B). The present invention also relates to a process of making these polyurethane emulsions and to substrates coated with the polyurethane emulsions.

17 Claims, No Drawings

AQUEOUS POLYURETHANE EMULSIONS

BACKGROUND OF THE INVENTION

1. Field of the Invention

The present invention relates to aqueous polyurethane emulsions that cure under the influence of high energy radiation and to their use as coating compositions, especially for coating wood and furniture.

2. Description of the Prior Art

EP-A-0 012 339 describes aqueous dispersions based on radiation-curable repolymers which are stabilized by dispersing agents such as polyvinyl pyrrolidone. However, these dispersions have the disadvantage that they are not miscible with other alkaline, radiation-curable dispersions or alkaline polyacrylate dispersions. Furthermore, as a result of the use of the dispersing agents a considerable amount of water is left behind in the film after evaporation, which can result in interference with the optics and hardness of the film in the course of curing by UV light.

Radiation-curable polyurethane dispersions are also described in EP-A-0 704 469, EP-A-0 753 531, EP-A-0 870 788 and EP-A-0 872 502. The polyurethane dispersions described therein already begin to dry physically to a considerable extent after evaporation of the water and prior to UV curing and show only slight penetration when applied to absorbent substrates such as wood. Therefore, they do not accentuate the natural structure or grain of wood, this accentuation is familiar to those skilled in the art. Moreover, the dispersions according to the state of the art that have begun to dry, but have not been cured, can only be inadequately redispersed in water, rendering difficult both the re-use and the cleaning of appliances that are required for application of the dispersions.

An object of the present invention is to provide radiation-curable, aqueous binders that are compatible with other binders and free of dispersing agents, show good penetration into absorbent substrates and accentuate the appearance of wood. Moreover, the binding agents should also be redispersible in water after evaporation of the water. These objects may be achieved with the polyurethane emulsions according to the invention.

SUMMARY OF THE INVENTION

The present invention relates to a radiation-curable, aqueous polyurethane emulsion which is prepared by I) reacting
- A) 40 to 90 wt. % of an isocyanate-reactive component that contains a polyester acrylate containing hydroxyl groups and having an OH content of 40 to 200 mg KOH/g and optionally other isocyanate-reactive compounds other than B) and
- B) 0.5 to 20 wt. % of one or more monofunctional and/or difunctional isocyanate-reactive compounds that contain cationic or anionic groups, potential cationic or anionic or hydrophilic ether groups, with
- C) 10 to 50 wt. % of one or more diisocyanates and/or polyisocyanates, II) optionally converting any potential cationic or anionic groups into cationic or anionic groups by salt formation and III) forming a dispersion of the reaction product of A), B) and C) in water and reacting it with
- D) 0.1 to 10 wt. % of one or more diamines and/or polyamines, wherein the wt. % percentages of (A) to (D) add up to 100%, and the equivalent ratio of the sum of the isocyanate-reactive groups in (A) and (B) to the isocyanate groups in (C) is 0.8:1 to 1.25:1 and the reaction of components (A) and (B) with (C) is carried out such that 65 to 95% of the isocyanate groups in (C) react with the isocyanate-reactive groups of (A) and (B).

The present invention also relates to a process of making these polyurethane emulsions and to substrates coated with the polyurethane emulsions.

DETAILED DESCRIPTION OF THE INVENTION

Suitable polyester acrylates A) include polycondensation products of dicarboxylic or oligocarboxylic acids or the anhydrides thereof (for example, adipic acid, sebacic acid, maleic anhydride, fumaric acid and phthalic acid) and difunctional polyols and/or polyols of higher functionality (e.g. ethylene glycol, propylene glycol, diethylene glycol, trimethylolpropane, pentaerythritol, alkoxylated diols or polyols, such as the addition product of ethylene oxide on trimethylolpropane with a hydroxyl value of 550) and acrylic acid and/or methacrylic acid.

Known hydrophilic groups are described, e.g., in Progress in Organic Coatings, 9 (1981), 291–296 and may also be incorporated into these polyester acrylates. Thus polyethylene glycols and/or methoxypolyethylene glycols may be incorporated through the alcohol component. Examples include polyethylene glycols and polypropylene glycols started on alcohols and the block copolymers thereof, as well as the monomethyl ethers of these polyglycols. Particularly suitable are a 1500 molecular weight polyethlylene glycol and/or a 500 molecular weight polyethylene glycol monomethyl ether.

It is also possible to convert a portion of the (excess) carboxyl groups, in particular those of (meth)acrylic acid, with monoepoxides, diepoxides or polyepoxides. This reaction can be used, in particular, for increasing the hydroxyl value of the polyester acrylate, since an OH group is formed in each instance during the epoxide/acid reaction.

The production of polyester acrylates is described in DE-A-4 040 290, DE-A-3 316 592, P.K.T. Oldring (Ed.), Chemistry & Technology of UV & EB Formulations for Coatings, Inks & Paints, Vol. 2, 1991, SITA Technology, London, pp 123–135.

Alternatively, known polyepoxy acrylates containing hydroxyl groups or polyurethane acrylates containing hydroxyl groups (preferably having hydroxyl values of 40 to 200 mg KOH/g) may also be employed, as well as mixtures thereof with one another and with unsaturated and/or saturated polyesters containing hydroxyl groups.

Component A) may also contain diols with short alkyl chains (2 to 10 carbon atoms) in amounts of less than 30 wt. %, preferably less than 10 wt. %, based on the weight of component (A). Examples of such diols include ethylene glycol, diethylene glycol, triethylene glycol, 1,3- or 1,4-butanediol, neopentyl glycol, 1,6-hexanediol or mixtures thereof.

Component A) may also contain hydroxy($C_1$–$C_6$ alkyl) (meth)acrylates in amounts of less than 30 wt. %, preferably less than 5 wt. %, based on the weight of component (A).

Compounds (B), which contain cationic groups, anionic groups and/or hydrophilic ether groups, include those which contain sulfonium, ammonium, carboxylate, sulfonate groups or groups that can be converted into the these groups by salt formation (potential cationic or anionic groups)

and/or polyether groups. These groups can be incorporated into the polyurethane emulsions by isocyanate-reactive groups, such as hydroxyl groups and amine groups. Examples of compounds (B) include bis(hydroxymethyl) propionic acid, bis(hydroxymethyl)butyric acid, hydroxypivalic acid, malic acid, glycolic acid, lactic acid, glycine, alanine, taurine, 2-aminoethylaminoethane sulfonic acid, polyethylene glycols, polypropylene glycols started on alcohols and the block copolymers thereof, as well as the monomethyl ethers of these polyglycols. Preferred are bis (hydroxymethyl)propionic acid and polyethylene glycol monomethyl ethers, especially those having a molecular weight of about 500.

The polyaddition can be performed with aromatic, araliphatic, aliphatic or cycloaliphatic polyisocyanates (C). Mixtures of polyisocyanates (C) may also be used. Suitable polyisocyanates (C) include butylene diisocyanate, hexamethylene diisocyanate (HDI), isophorone diisocyanate (IPDI), trimethylhexamethylene diisocyanate (2,2,4- and/or 2,4,4-trimethylhexamethylene diisocyanate), the isomeric bis(4,4'-isocyanatocyclohexyl)methanes, isocyanatomethyl-1,8-octane diisocyanate, 1,4-cyclohexylene diisocyanate, 1,4-phenylene diisocyanate, 2,4- and/or 2,6-toluylene diisocyanate, 1,5-naphthylene diisocyanate, 2,4'- or 4,4'-diphenylmethane diisocyanate, triphenylmethane-4,4',4''-triisocyanate or the derivatives of these isocyanates containing urethane, isocyanurate, allophanate, biuret, uretdione and/or imino-oxadiazinedione groups and mixtures thereof. Preferred are hexamethylene diisocyanate, isophorone diisocyanate, the isomeric bis(4,4'-isocyanatocyclohexyl) methanes and mixtures thereof. Isophorone diisocyanate is especially preferred.

Diamines and/or polyamines (D) serve to increase the molar mass. Since this reaction takes place in the aqueous medium, the diamines and/or polyamines (D) have to be more reactive than water in relation to their reaction with isocyanate groups. Examples include ethylenediamine, 1,6-hexamthylenediamine, isophoronediamine, 1,3-phenylenediamine, 1,4-phenylenediamine, 4,4'-diphenylmethanediamine, amino-functional polyethylene oxides or polypropylene oxides (such as the Jeffamine resins, D series, available from Huntsman), triethylenetetramine and hydrazine. Ethylenediamine is preferred.

Monoamines such as butylamine, ethylamine and amines of the Jeffamine M series (Huntsman), aminofunctional polyethylene oxides and polypropylene oxides may also be added.

All processes known from the state of the art may be used to produce the polyester acrylate urethane dispersions, such as emulsifier/shear-force, acetone, prepolymer-mixing, melt-emulsifying, ketimine and spontaneous solids-dispersing processes or processes derived therefrom. A summary of these methods may be found in Methoden der Organischen Chemie, Houben-Weyl, 4$^{th}$ Edition, Volume E20/Part 2, p 1682, Georg Thieme Verlag, Stuttgart, 1987. Experience has shown that the melt-emulsifying process and the acetone process are best suited. The melt-emulsifying process is particularly preferred.

In this process components (A) and (B) are charged in the reactor to prepare the initial polyester acrylate urethane solution. If the process requires this (e.g. in the case of the acetone process, optionally also in the case of the melt-emulsifying process), they are diluted with a solvent that is miscible with water but inert to isocyanate groups. In the case of the melt-emulsifying process they are heated up to fairly high temperatures of 50 to 120° C., preferably without solvent.

Suitable solvents include acetone, butanone, tetrahydrofuran, dioxan, acetonitrile, dipropylene glycol dimethyl ether and 1-methyl-2-pyrrolidone. Furthermore, the known catalysts for accelerating the isocyanate-addition reaction (such as triethylamine, 1,4-diazabicyclo-[2.2.2]-octane, tin dioctoate or dibutyltin dilaurate) can also be charged at the same time.

Polyisocyanates (C) are added dropwise to these mixtures. The equivalent ratio of isocyanate reactive groups in (A) and (B) to isocyanate groups in (C) is 0.8:1 to 1.25:1, preferably 0.96:1 to 1.25:1, more preferably 1:1. However, in accordance with the invention the conversion of components (A) and (B) with (C) is permitted only up to a degree of conversion of 65 to 95%, preferably 80 to 90%, of the isocyanate groups, based on the total quantity of NCO groups in (C).

The degree of conversion is conventionally monitored by tracking the NCO content of the reaction mixture. To this end, both spectroscopic measurements (IR or NIR spectra) and chemical analyses (titrations) of withdrawn samples can be used. After the desired NCO content has been reached, the further conversion of (A) and (B) with (C) is greatly reduced by lowering the temperature as fast as possible. How far the reaction temperature has to be lowered depends upon the reaction partners being used (in particular, the reactivity of the isocyanates) and can be monitored by further tracking of the NCO content of the mixture.

If compounds B) were not in the form of cationic or anionic groups when they were initially incorporated, after production of the polyester acrylate urethane solutions of (A), (B) and (C) these groups are converted to salt groups to form the anionic and/or cationic groups. In the case of anionic groups, bases such as ammonia, triethylamine, triethanolamine, potassium hydroxide or sodium carbonate can be used. In the case of cationic groups, dimethyl sulfate or succinic acid can be used. If use is made only of compounds (B) with ether groups, the no neutralization step is necessary.

In a next reaction step, the polyester urethane solutions of (A), (B) and (C) are either introduced into water which contains the polyamine(s) (D) or the dispersing water/ polyamine D mixture is stirred into the polyester urethane solutions of (A), (B) and (C). The increase in molecular weight is then effected in a final reaction step by reacting the remaining isocyanate groups with amino groups to form the dispersions according to the invention. The quantity of polyamine (D) that is employed depends upon the content of unreacted isocyanate groups. It may be advantageous not to convert all of the isocyanate groups that are still available with polyamines (D), but to convert only a portion of these groups. The unconverted isocyanate groups then undergo reaction slowly with water. Preferably less than 50% of the isocyanate groups are reacted with polyamines (D).

In another embodiment of the process the dispersing step may be initially carried out and component (D), advantageously diluted in water, may be added subsequently.

If desired, any organic solvent present can be distilled off. The dispersions then have a solids content of 20 to 60 wt. %, preferably 30 to 55 wt. %.

After evaporation of the water, and without the addition of any additives, the polyester acrylate urethane dispersions according to the invention result in coatings that are dust-dry to slightly tacky. By virtue of subsequent crosslinking that is induced by radiation chemistry and/or radically, the films cure to yield particularly high grade, scratch resistant and chemical resistant coatings.

In the case of polymerization that is induced by radiation chemistry (UV rays, electron beams, X-rays or gamma rays), UV curing is particularly preferred. The UV curing is triggered in the presence of photo-initiators. Suitable as photo-initiators include aromatic ketone compounds such as benzophenones, alkylbenzophenones, 4,4'-bis (dimethylamino)benzophenone (Michler's ketone), anthrone and halogenated benzophenones. Also suitable are acylphosphine oxides such as 2,4,6-trimethylbenzoyl-diphenylphosphine oxide, phenylglyoxylic ester, anthraquinone and its derivatives, benzil ketals and hydroxyalkyl phenones. Mixtures of these compounds may also be employed.

If curing is effected radically, water-soluble peroxides or aqueous emulsions of initiators are suitable that are not soluble in water. These radical-formers can be combined with accelerators in known manner.

The polyester acrylate urethane dispersions according to the invention can be applied onto a wide range of substrates by conventional techniques including spraying, rolling, blade-coating, pouring, brushing or dipping. If the polyester acrylate urethane dispersions according to the invention are applied onto wood, the resulting surfaces have outstanding surface optics that accentuates the natural texture of the wood. The polyester acrylate urethane dispersions according to the invention are therefore especially suitable for primary coats, e.g. in the multilayer lacquering of prefabricated parquet flooring. The primary coats can subsequently be overcoated with other coating compositions that are known for coating parquet flooring, such as aqueous UV-curable polyurethane dispersions or 100-percent UV-curable polyester acrylates and/or urethane acrylates.

In addition to wood, other absorbent substrates (such as paper, cardboard and leather), and also metals and plastics can be coated with the dispersions according to the invention.

The polyester acrylate urethane dispersions according to the invention can be used as sole binder or can be mixed or combined with other known binders and also with known additives including dispersants, pigments, dyestuffs or levelling agents. In particular, combinations with other polyurethane dispersions or with polyacrylate dispersions are possible without any difficulty.

EXAMPLES

Unsaturated Polyester 1a)

706 g of maleic anhydride and 382 g of diethylene glycol were stirred at 150° C. for 6 hours in a heatable reaction vessel with stirrer, internal thermometer, gas feed and distillation head, while nitrogen was passed over at a rate of 3 to 4 l/h. Subsequently, a further 611 g of diethylene glycol and 324 g of a 1500 molecular weight polyethylene glycol and 0.4 g of toluhydroquinone were added and, while the flow of nitrogen and the stirring was maintained, reaction water was distilled off at 150° C. After 4 h the temperature was raised to 180° C. and was maintained until the acid value of the product had fallen below 15 mg KOH/g.

The product had an iodine color index of 2.0, a viscosity of 17.7 Pa·s at 23° C. and, when left standing for a fairly long time, a tendency to crystallize, which could be reversed prior to further conversion of the product by heating to 60° C.

Polyether Acrylate 1b)

6028 g of an ethoxylated trimethylolpropane with a hydroxyl value of 550, 2837 g of acrylic acid, 3495 g of iso-octane, 82 g of toluene-p-sulfonic acid, 25 g of hydroquinone monomethyl ether and 2 g of 2,5-di-tert.butyl-hydroquinone were heated at the water separator to vigorous boiling (internal temperature 90–100° C.) for 16 hours in a heatable reaction vessel with stirrer, internal thermometer, gas feed and distillation head, while air was passed through at a rate of 3 to 4 l/h. The reaction was concluded when the acid value of the mixture had fallen below 7 mg KOH/g. Subsequently 168 g of glycidyl methacrylate were added, and iso-octane was distilled off under vacuum (100 mbar), while the temperature was slowly raised to 100° C. The reaction was concluded when the acid value of the product had fallen below 2 mg KOH/g.

The product had an iodine color index of 0.2, a viscosity of 170 mPa·s at 23° C. and a hydroxyl value of 143 mg KOH/g.

Polyester Acrylate 2)

734 g of an ethoxylated trimethylolpropane with a hydroxyl value of 550, 734 g of acrylic acid, 268 g of cyclohexane, 10 g of toluene-p-sulfonic acid, 3 g of hydroquinone monomethyl ether, 0.2 g of 2,5-di-tert.butyl-hydroquinone were heated at the water separator to vigorous boiling (internal temperature 85–95° C.) for 16 hours in a heatable reaction vessel with stirrer, internal thermometer, gas feed and distillation head, while air was passed through at a rate of 3 to 4 l/h. The reaction was concluded when the acid value of the mixture had fallen below 4 mg KOH/g. Subsequently cyclohexane was distilled off under vacuum (100 mbar), while the temperature was raised slowly to 100° C.

The product had an iodine color index of 0.7, a viscosity of 350 mPa·s at 23° C. and a hydroxyl value of 65 mg KOH/g.

Polyester Acrylate 3)

58.8 g of maleic anhydride, 734.4 g of ethoxylated trimethylolpropane with a hydroxyl value of 550, 77.6 g of a 1500 molecular weight polyethylene glycol, 78.4 g of diethylene glycol, 12.5 g of toluene-p-sulfonic acid, 0.1 g of toluhydroquinone and 300 g of iso-octane were stirred for 4 hours under reflux (about 100° C.) in a heatable reaction vessel with stirrer, internal thermometer, gas feed and distillation head, while nitrogen was passed over at a rate of 3 to 4 l/h. Subsequently 345.6 g of acrylic acid, 3.5 g of toluene-p-sulfonic acid, 3.6 g of hydroquinone monomethyl ether and 0.3 g of 2,5-di-tert.butyl-hydroquinone were added to the cooled mixture. Heating was effected at the water separator to vigorous boiling (internal temperature 85–95° C.) for about 14 hours, while air was passed through at a rate of 3 to 4 l/h. The reaction was concluded when the acid value of the mixture had fallen below 4 mg KOH/g. After cooling to 80° C., 36.8 g of the diglycidyl ether of bisphenol A were added, and iso-octane was distilled off under vacuum (50 mbar), while the temperature was raised slowly to 95° C.

The product had an iodine color index of 0.7, a viscosity of 390 mPa·s at 23° C. and a hydroxyl value of 128 mg KOH/g.

PUR Emulsion 1)

31.8 g of unsaturated polyester 1a), 198.7 g of polyether acrylate 1b), 7.9 g of dimethylolpropionic acid, 0.3 g of dibutyltin dilaurate and 0.2 g of toluhydroquinone were homogenized for a short time at 100° C. in a reaction vessel with stirrer, internal thermometer, gas feed (air current 2 to 3 l/h) and dropping funnel. At 65° C. a mixture of 53.3 g of IPDI and 20.2 g of HDI was added dropwise such that the temperature did not rise above 70° C. Stirring was effected at 65° C. until such time as the reaction mixture had an NCO content below 1.7%. Then cooling was effected to 50° C., and 3.2 g of triethylamine and 3.6 g of diisopropylethylamine were rapidly added. After 30 min, 420 g of water at 40° C. were added, subject to rapid stirring. After the dispersion had formed, 2.4 g of ethylenediamine in 9.6 g of water were added. After 2 h of further stirring at room temperature the product was filtered. The viscosity was 120 mPa·s at 23° C.

PUR Emulsion 2)

The preparation of PUR emulsion 1) was repeated, with the following changes. 240 g of polyester acrylate 2), 9.6 g of dimethylolpropionic acid, 0.3 g of dibutyltin dilaurate were initially added to the reaction vessel. 42.6 g of IPDI were added dropwise. Stirring was effected at 65° C. until such time as the reaction mixture had an NCO content below 1.1%. Then cooling was effected to 50° C., and 3.7 g of triethylamine and 4.5 g of diisopropylethylamine were rapidly added. After 30 minutes 438 g of water at 40° C. were added, subject to rapid stirring. After the dispersion had formed, 0.5 g of ethylenediamine in 2.0 g of water were added. After 2 h of further stirring at room temperature the product was filtered. The viscosity was 24 mPa·s at 23° C.

PUR Emulsion 3)

The preparation of PUR emulsion 1) was repeated, with the following changes. 199.0 g of polyester acrylate 3), 6.0 g of dimethylolpropionic acid, 6.4 g of a 500 molecular weight methoxypolyethylene glycol and 0.3 g of dibutyltin dilaurate were initially added to the reaction vessel. 64.0 g of IPDI were added dropwise. Stirring was effected at 65° C. until the reaction mixture had an NCO content below 1.3%. Then cooling was effected to 50° C., and 2.2 g of triethylamine and 2.9 g of diisopropylethylamine were rapidly added. After 30 minutes 412 g of water at 23° C. were added, subject to rapid stirring. After the dispersion had formed, 0.6 g of ethylenediamine in 2.3 g of water were added. After 2 h of further stirring at room temperature the product was filtered. The viscosity was 17 mPa·s at 23° C.

APPLICATION EXAMPLES

The polyurethane dispersions (PUR 1, PUR 2, PUR 3) according to the invention, as well as, by way of reference, the UV-curable dispersions Laromer PE 55W (polyester acrylate with dispersing agent, BASF) and Bayhydrol UV VP LS 2282 (UV-curable PUR dispersion which began to dry physically to a considerable extent, Bayer AG).

|   |   | PUR 1 | PUR 2 | PUR 3 | Laromer PE 55W | Bayhydrol UV VP LS 2282 |
|---|---|---|---|---|---|---|
| Solids content | 1 | 40 wt. % | 40 wt. % | 40 wt. % | 49 wt. % | 40 wt. % |
| pH value | 2 | 7.3 | 8.4 | 7.9 | 4.6 | 8.3 |
| Viscosity | 3 | 120 mPas | 24 mPas | 17 mPas | 466 mPas | 20 mPas |
| Appearance of emulsion | 4 | slightly colloidal | slightly colloidal | slightly colloidal | milky | slightly colloidal |
| Pendulum hardness | 5 | 129 113 102 | 99 72 44 | 140 122 91 | 79 64 38 | 165 151 136 |
| Particle size | 6 | 87 | 109 | 129 | 650 | 150 |
| Accentuation | 7 | 0 | 0 | 0 | 0 | 4 |
| Water resistance | 8 | 0 | 0 | 0 | 0 | 0 |

|   |   | PUR 1 | PUR 2 | PUR 3 | Laromer PE 55W | Bayhydrol UV VP LS 2282 |
|---|---|---|---|---|---|---|
| Ethanol resistance | 9 | 0 | 0 | 0 | 0 | 0 |
| Compatibility with Neocryl XK 55 | 10 | OK glassy coat slightly cloudy | OK glassy coat slightly cloudy | OK glassy coat slightly cloudy | OK glassy coat cloudy | OK glassy coat slightly cloudy |
| Compatibility with NeoRad R450 | 10 | OK glassy coat clear | OK glassy coat clear | OK glassy coat clear | unstable | OK glassy coat clear |
| Compatibility with Luhydran 848 S | 10 | OK glassy coat clear | OK glassy coat clear | OK glassy coat clear | unstable | OK glassy coat clear |
| Compatibility with Joncryl SCX 8222 | 10 | OK glassy coat cloudy | OK glassy coat cloudy | OK glassy coat cloudy | unstable | OK glassy coat cloudy |
| Compatibility with Bayhydrol UV VP LS 2282 | 10 | OK glassy coat clear | OK glassy coat clear | OK glassy coat clear | unstable | OK glassy coat clear |

1 according to DIN EN ISO 3251 (1 g of 125° C.)
2 according to DIN 53785
3 rotational viscometer 23° C.
4 visual assessment
5 binder dispersion+1.5% Irgacure 500 (Ciba); wet film 150 μm; 60 min drying at 20 to 23° C.; UV curing Hg lamp 80 W/cm a) 3 m/min feed; b) 5 m/min feed; c) 10 m/min feed; measured: pendulum hardness according to König
6 according to laser correlation spectrometry measurement
7 film coating on walnut, see Point 5; visual assessment by grades: grade 0=best result; grade 5=poorest result
8 cross-coating by means of box-type doctor blade; 2*150 μm on maple with intermediate drying and intermediate polishing; see Point 5; loading 16 h (see also DIN 68861)
9 see Point 8
10 blend 1:1, then assessment as to whether the blend became unstable (e.g. very high increase in viscosity or coagulation); if possible, 150 μm wet film was produced and dried at 20–23° C. and then the clarity of the film was assessed visually.

Neocryl XK 55 (acrylate dispersion, Zeneca);
NeoRad R450 (UV-curable PUR dispersion, Zeneca);
Luhydran 848S (acrylate dispersion, BASF);
Joncryl SCX 8222 (acrylate dispersion, Jonssen);
Bayhydrol UV VP LS 2282 (UV-curable PUR dispersion, Bayer AG).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A radiation-curable, aqueous polyurethane emulsion which is prepared by a process comprising
   I) reacting
      A) 40 to 89.4 wt. % of an isocyanate-reactive component that contains an unsaturated polyester acrylate containing hydroxyl groups and having an OH content of 40 to 200 mg KOH/g and optionally other isocyanate-reactive compounds other than B) and
      B) 0.5 to 20 wt. % of one or more monofunctional and/or difunctional isocyanate-reactive compounds that contain cationic or anionic groups, potential cationic or anionic or hydrophilic ether groups, with
      C) 10 to 50 wt. % of one or more diisocyanates and/or polyisocyanates,
   II) optionally converting any potential cationic or anionic groups into cationic or anionic groups by salt formation and
   III) forming a dispersion of the reaction product of A), B) and C) in water and reacting it with
      D) 0.1 to 10 wt. % of one or more diamines and/or polyamines,
   wherein the wt. % percentages of (A) to (D) add up to 100%, the equivalent ratio of the sum of the isocyanate-reactive groups in (A) and (B) to the isocyanate groups in (C) is 0.96:1 to 1.25:1 and the reaction of components (A) and (B) with (C) is carried out such that 65 to 95% of the isocyanate groups in (C) react with the isocyanate-reactive groups of (A) and (B).

2. The polyurethane emulsion of claim 1 wherein component (A) contains a $C_2$–$C_{10}$ alkyl diol.

3. The polyurethane emulsion of claim 1 wherein component (A) contains a hydroxy($C_1$–$C_6$ alkyl) (meth)acrylate.

4. The polyurethane emulsion of claim 1 wherein the reaction of components (A) and (B) with (C) is carried out such that 80 to 90% of the isocyanate groups in (C) react with the isocyanate-reactive groups of (A) and (B).

5. The polyurethane emulsion of claim 1 wherein the equivalent ratio of the sum of the isocyanate-reactive groups in (A) and (B) to isocyanate groups in (C) is 1:1 to 1.25:1.

6. The polyurethane emulsion of claim 5 wherein component (A) contains a $C_2$–$C_{10}$ alkyl diol.

7. The polyurethane emulsion of claim 5 wherein component (A) contains a hydroxy($C_1$–$C_6$ alkyl) (meth)acrylate.

8. The polyurethane emulsion of claim 5 wherein the reaction of components (A) and (B) with (C) is carried out such that 80 to 90% of the isocyanate groups in (C) react with the isocyanate-reactive groups of (A) and (B).

9. A process for preparing a radiation-curable, aqueous polyurethane emulsion which comprises
   I) reacting
      A) 40 to 89.4 wt. % of an isocyanate-reactive component that contains an unsaturated polyester acrylate containing hydroxyl groups and having an OH content of 40 to 200 mg KOH/g and optionally other isocyanate-reactive compounds other than B) and
      B) 0.5 to 20 wt. % of one or more monofunctional and/or difunctional isocyanate-reactive compounds that contain cationic or anionic groups, potential cationic or anionic or hydrophilic ether groups, with
      C) 10 to 50 wt. % of one or more diisocyanates and/or polyisocyanates,
   II) optionally converting any potential cationic or anionic groups into cationic or anionic groups by salt formation and
   III) forming a dispersion of the reaction product of A), B) and C) in water and reacting it with
      D) 0.1 to 10 wt. % of one or more diamines and/or polyamines,
   wherein the wt. % percentages of (A) to (D) add up to 100%, the equivalent ratio of the sum of the isocyanate-reactive groups in (A) and (B) to the isocyanate groups in (C) is 0.96:1 to 1.25:1 and the reaction of components (A) and (B) with (C) is carried out such that 65 to 95% of the isocyanate groups in (C) react with the isocyanate-reactive groups of (A) and (B).

10. The process of claim 9 which comprises forming a dispersion by adding a mixture of water and component (D) to the reaction product of (A), (B) and (C).

11. The process of claim 9 which comprises dispersing the reaction product of (A), (B) and (C) into a mixture of water and component D).

12. The process of claim 9 wherein the equivalent ratio of the sum of the isocyanate-reactive groups in (A) and (B) to isocyanate groups in (C) is 1:1 to 1.25:1.

13. The process of claim 12 wherein the reaction of components (A) and (B) with (C) is carried out such that 80 to 90% of the isocyanate groups in (C) react with the isocyanate-reactive groups of (A) and (B).

14. The process of claim 9 wherein the reaction of components (A) and (B) with (C) is carried out such that 80 to 90% of the isocyanate groups in (C) react with the isocyanate-reactive groups of (A) and (B).

15. A binder-containing coating composition containing the polyurethane emulsion of claim 1 as the binder.

16. A substrate coated with the composition of claim 15.

17. The substrate of claim 1 wherein the substrate is wood.

* * * * *